United States Patent Office 3,174,040
Patented Mar. 16, 1965

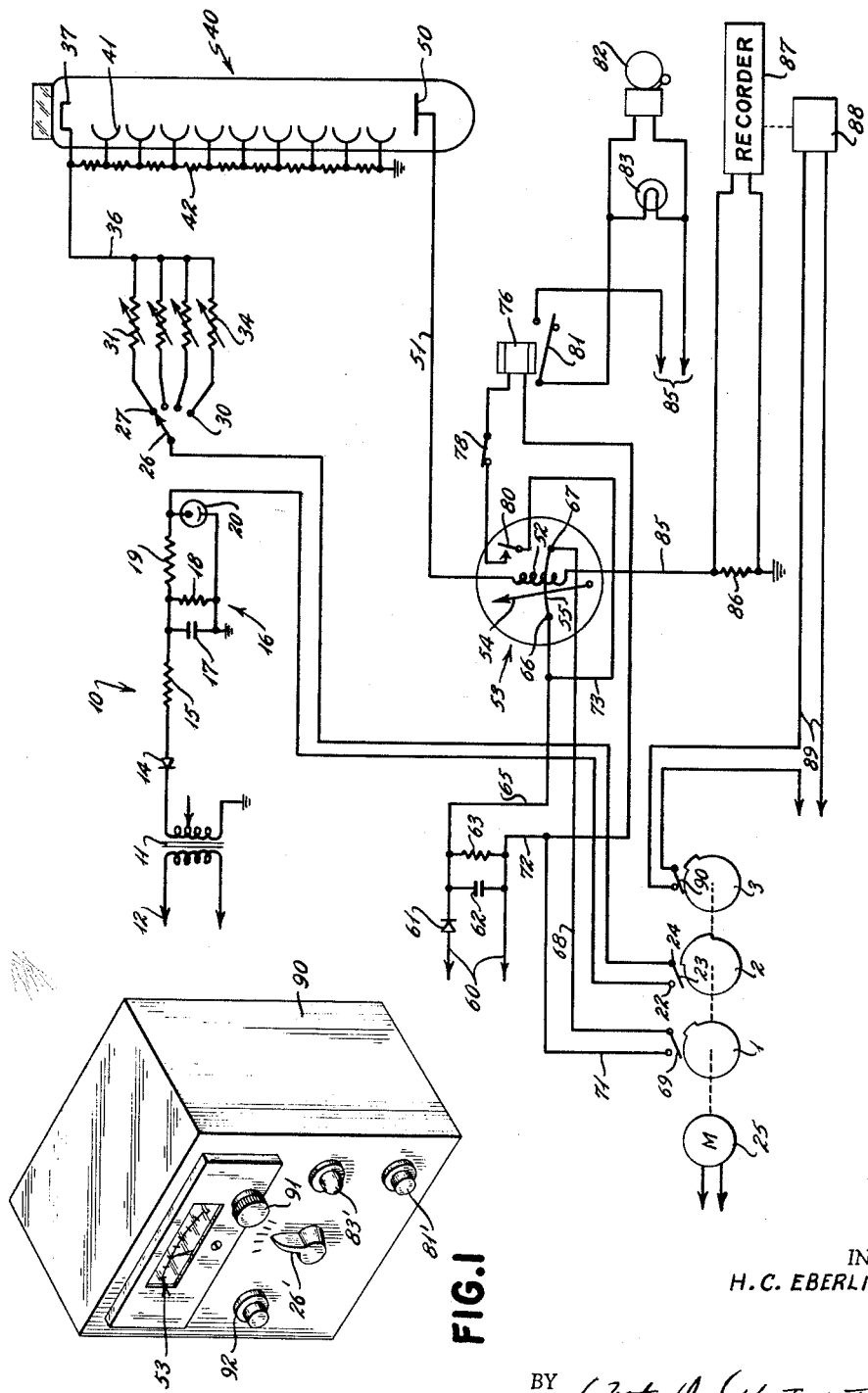

3,174,040
SINGLE CHANNEL REMOTE RADIATION MONITOR WITH MEANS TO PREVENT DRIFT IN THE PHOTOMULTIPLIER TUBE
Howard C. Eberline, Santa Fe, N. Mex., assignor to Eberline Instrument Corporation, Santa Fe, N. Mex., a corporation of New Mexico
Filed June 12, 1961, Ser. No. 116,495
2 Claims. (Cl. 250—71.5)

This invention relates to the detection of radiation and more particularly to a radiation indicator particularly adapted to monitor radiation at a remote location and to record as well as to provide visual indication of the level and to operate an alarm if such level exceeds a predetermined maximum.

In the monitoring of radiation it is desirable to have an indication of the level continuously available from which a record may be made and in order that supervisory personnel may have such information and to automatically operate an alarm if excessive radiation is experienced.

In such monitoring, readings may be required over a long period of time, days, weeks or months. One of the widely used detecting methods includes the use of a scintillation crystal with a photomultiplier tube, the radiation producing scintillations which vary the operation of the tube in a manner that provides an indication of the level of radiation. However, continuous operation of photomultiplier tubes causes drift therein and hence results in inaccuracy of response. Such inaccuracy may be compensated or tolerated in certain situations, but not in others. Hence, there has been a problem in the attempted use of scintillation detectors for monitoring.

A further problem has been in the use of radiation detectors located remotely, e.g., a mile, from the supervisory station, due to the necessity for compensating for variation in signal or voltage drop between the detector and the station.

Accordingly, it is an object of the present invention to provide a radiation monitor including a photomultiplier tube and adapted for remote area monitoring and which may be used continuously for an extended period without producing drift in the photomultiplier.

A further object is the provision of a monitor adapted for operating a recorder and an alarm and which provides a substantially continuous visible indication of the latest reading.

These and other objects of the invention will become apparent from the following description in conjunction with the accompanying drawing, in which:

FIG. 1 is a perspective of the exterior of a control box which may be used with the present invention; and FIG. 2, a schematic circuit diagram of an illustrative embodiment.

Briefly stated, the monitor circuit includes a power supply, a range switch and a detector of the photomultiplier-scintillation crystal type. The output from the detector is connected to a meter to operate an indicating needle. The needle is locked in at each reading until released. A recorder and an alarm may be connected to the meter if desired. Provision is made to operate the photomultiplier tube, the release for the needle of the meter and the recorder at predetermined intervals.

With further reference to the drawing, there is represented a high voltage power supply 10 including a step-up transformer 11 having leads 12 for connection to a conventional source of alternating current. The output transformer is connected to a diode 14, resistor 15 and a network 16 having a capacitor 17 and resistor 18 therein, and a resistor 19 and voltage regulator tube 20 in series. At the output 22 the power supply is connected to a switch 23 which is periodically operated by cam 2 driven by timing motor 25. The arm 23 of the switch is periodically connected to its contact 24 which is connected to arm 26 of a range selector switch. The range selector switch has contacts 27 to 30, inclusive, for connecting any of adjustable rheostats 31 to 34, inclusive, in series with the power supply. From the rheostat, line 36 is connected to the cathode 37 of the photomultiplier tube 40 having dynodes 41 and voltage dropping resistors 42.

The anode 50 of the photomultiplier tube is connected by line 51 to the coil 52 of the meter 53. The meter is of a type having an indicating needle 54 operated by movement of the coil and a locking device 55 for holding the needle in the position of the last reading.

The needle locking device is operated by a power supply including leads 60, diode 61, and capacitor 62 and resistor 63 across the leads. Power supply line 65 is connected to contact 66 of the needle locking device. The other contact 67 is connected by lead 68 to switch 69 operated by cam 1 from the timer 25. The other side of switch 69 is connected by line 71 to the output 72 from the power supply.

If an alarm is desired, line 72 and branch 73 from line 65 are connected to relay coil 76 through normally closed switch 78 and switch 80. Relay coil 76 operates relay switch 81 which is in series with alarm indicators 82 and 83 having power supply leads 85.

If a recorder is used, coil 52 of the meter is connected by line 85 to resistor 86 which is bridged by the indicator of the recorder 87. Operation of the recorder is controlled by unit 88 connected to lines 89 and switch 90 which is operated by cam 3 from the timer 25.

It is contemplated that the timer will operate for cycles of approximately a minute, although other periods of operation may be used. For one minute cycles, the cams are set to operate so that cam 1 closes switch 69 for approximately five seconds in order to release needle 54 from the locking mechanism. Cam 2 closes switch 23 for approximately five seconds in order to supply power to the photomultiplier and thus to operate the meter while its needle is unlocked. Cam 3 causes the recorder to operate for approximately five seconds.

Preferably cam 1 is set to close its switch approximately one-half second after cams 2 and 3 close their respective switches and to open its switch approximately one-half second before the latter are opened. This causes the needle to be held in its position of the last reading until the meter is energized for the next reading, thus, reducing needle swinging or oscillation, and causing the needle to be locked just before deenergization of the meter. During the remaining approximately 55 seconds of the cycle the cam operated switches are open.

The detector head may be provided with a heater and a test source of radiation of the type described in my copending application filed of even date herewith.

The monitor of the present invention is adapted for use with the detector at a remote location, lengthy transmission lines, e.g., one mile, having no appreciable effect on the accuracy in view of the use of the direct current operated detector.

The control unit of FIG. 1 may be provided for convenient operation of the monitor. It includes a housing 90 with an off-on switch 91 and a window through which the face of meter 53 is visible. Switch arm 26' is connected to switch 26 for selecting the range. Light 83 is visible at 83'. Relay switch 81 may be reset by pushbutton 81'. If a test source is employed switch 92 may operate the shielding device in the detector head to expose the source to the crystal. Leads from the power lines 12, 69, 85 and 89 and for the timing motor are brought to the control unit for connection to suitable sources of power.

In the operation of the device the detector head having the photomultiplier tube and crystal is positioned at the location to be monitored. As the timing motor turns the cams 1, 2 and 3 for each cycle, the photomultiplier tube is energized and provides a substantially instantaneous reading on the meter 53, and such indication is held on the meter until changed in a succeeding cycle. Thus, the needle is held substantially steady and reading by an observer facilitated.

Accordingly, it will be understood that the present invention includes a scintillation detector for a remote station and is powered by a cyclic operated stable supply in which timing means is connected to provide cyclical operation of a locking meter and to which alarm and recording devices may be connected.

It will be obvious to those skilled in the art that various changes may be made in the described embodiment of the invention without departing from the spirit and scope thereof, and therefore the invention is not limited by that which is illustrated in the drawing and described in the specification, but only as indicated in the claims.

What is claimed is:

1. A radiation monitor comprising a direct current steady power supply, a photomultiplier tube connected to said supply, a scintillation crystal associated with said photomultiplier tube whereby emanations from the crystal control the output of the tube, voltage dropping elements, means for connecting said power supply to said photomultiplier tube and to said voltage dropping elements, first switch means in the connecting means from said power supply to said voltage dropping elements, a meter connected directly to the output of said tube, a recorder connected to the output of said tube, said meter having a limit switch and locking means, said locking means being releasable by connection to a source of power, a timer, first, second and third cams operated by the timer, said first cam operating the switch for connecting the power supply to the voltage dropping elements, said second cam operating the connection to the needle unlocking means and said third cam operating the connection to a recorder drive, and an alarm relay connected to the meter limit switch.

2. In a radiation monitor, a detector having a photomultiplier tube, a power supply, means connecting said power supply to said photomultiplier tube, first switch means in said connecting means, a meter connected directly to the output from said tube, said meter having a locking means, means for disabling said locking means, second switch means for said disabling means, and means for cyclically operating said first switch means to energize said tube, said second switch means to energize said disabling means, said second switch means to de-energize said disabling means, and said first switch means to de-energize said tube, seriatim, to cause said meter to continually indicate a reading and without returning to zero.

References Cited in the file of this patent

UNITED STATES PATENTS

| | | |
|---|---|---|
| 2,709,754 | Davidon | May 31, 1954 |
| 2,874,354 | Bell | Feb. 17, 1959 |
| 3,016,787 | Brehm | Jan. 16, 1962 |